United States Patent
Kolthoff

(10) Patent No.: US 9,597,776 B2
(45) Date of Patent: Mar. 21, 2017

(54) GRINDING DISK

(71) Applicant: Kolthoff & Co., Flüelen (CH)

(72) Inventor: Dieter Kolthoff, Flüelen (CH)

(73) Assignee: Kolthoff Gabrovo EOOD, Gabrovo (BG)

( * ) Notice: Subject to any disclaimer, the term of this patent is extended or adjusted under 35 U.S.C. 154(b) by 120 days.

(21) Appl. No.: 14/547,355

(22) Filed: Nov. 19, 2014

(65) Prior Publication Data

US 2015/0140910 A1    May 21, 2015

(30) Foreign Application Priority Data

Nov. 21, 2013  (DE) .................... 20 2013 010 480 U

(51) Int. Cl.
| | |
|---|---|
| *B24D 9/10* | (2006.01) |
| *B24D 11/00* | (2006.01) |
| *B29C 45/14* | (2006.01) |
| *B29K 21/00* | (2006.01) |
| *B29L 9/00* | (2006.01) |

(52) U.S. Cl.
CPC .............. *B24D 9/10* (2013.01); *B24D 11/001* (2013.01); *B29C 45/14819* (2013.01); *B29K 2021/003* (2013.01); *B29L 2009/00* (2013.01)

(58) Field of Classification Search
CPC .. B24B 23/02; B24D 7/00; B24D 7/04; B24D 9/08; B24D 9/085; B24D 9/10; B24D 11/001; B24D 15/023
See application file for complete search history.

(56) References Cited

U.S. PATENT DOCUMENTS

| | | | |
|---|---|---|---|
| 3,333,371 A | 8/1967 | Pratt et al. | |
| 5,150,546 A * | 9/1992 | Tucker | B24D 9/08 15/230 |
| 7,033,262 B2 * | 4/2006 | Takizawa | B24D 9/085 451/359 |
| 7,094,138 B2 * | 8/2006 | Chang | B24D 9/085 451/359 |
| 7,223,165 B2 | 5/2007 | Wuensch et al. | |
| 9,302,365 B2 * | 4/2016 | Valentini | B24B 23/02 |
| 2010/0015900 A1 * | 1/2010 | Valentini | B24D 9/08 451/490 |

(Continued)

FOREIGN PATENT DOCUMENTS

EP    2366498 A2    9/2011

*Primary Examiner* — Timothy V Eley
(74) *Attorney, Agent, or Firm* — Gudrun E. Huckett

(57) ABSTRACT

A grinding disk is provided with a support plate with anchoring projections. A drive connector is connected to the support plate. An elastically deformable pad in the form of an injection molded part of un-foamed elastomeric thermoplastic synthetic material is provided and has a first face and an opposite second face. The pad has a chamber structure provided on the first face. The chamber structure has chambers laterally delimited by intermediate walls. The chambers have a top side that is open and is facing in a direction of the first side. The pad has a substantially closed support surface provided on the second face and facing away from the chamber structure. A working element is to be attached to the support surface. The support plate is connected to the first face of the pad to support the pad. The anchoring projections of the support plate are embedded within the pad.

15 Claims, 5 Drawing Sheets

(56) References Cited

U.S. PATENT DOCUMENTS

2013/0157552 A1  6/2013  Kolthoff
2014/0179205 A1* 6/2014  Chen .................. B24D 18/0009
                                              451/490

* cited by examiner

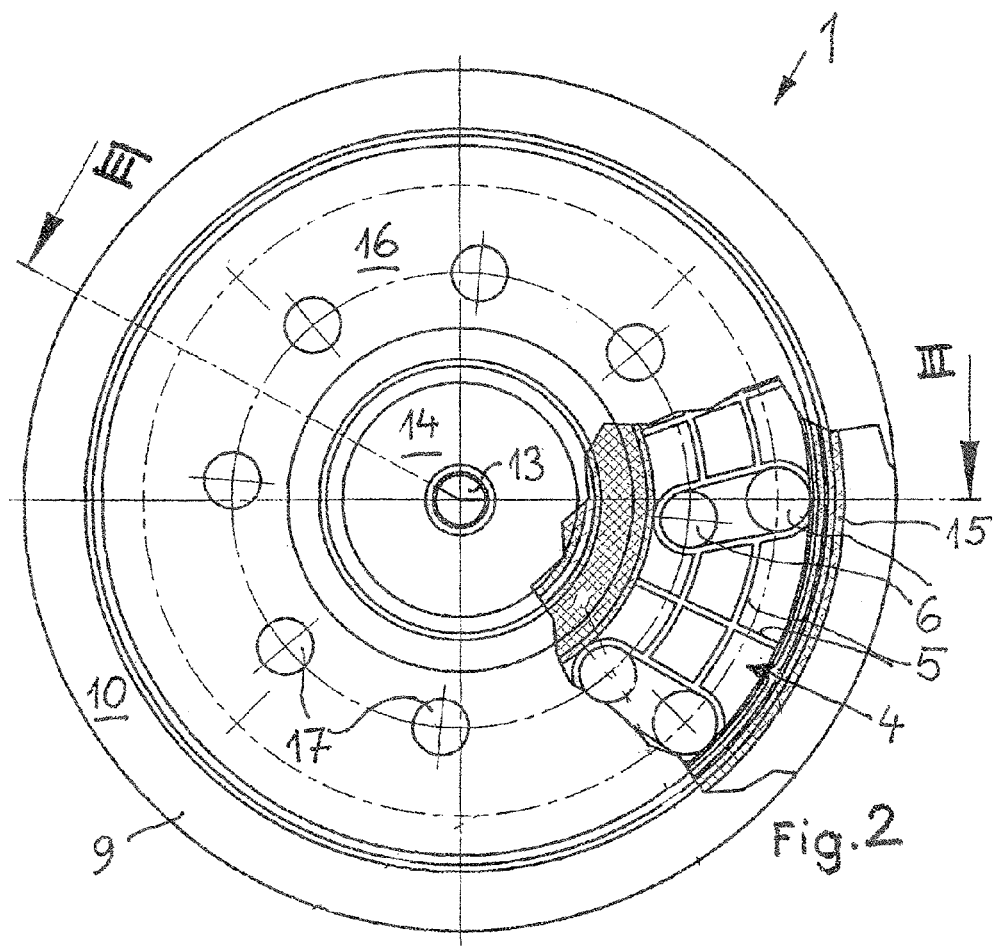
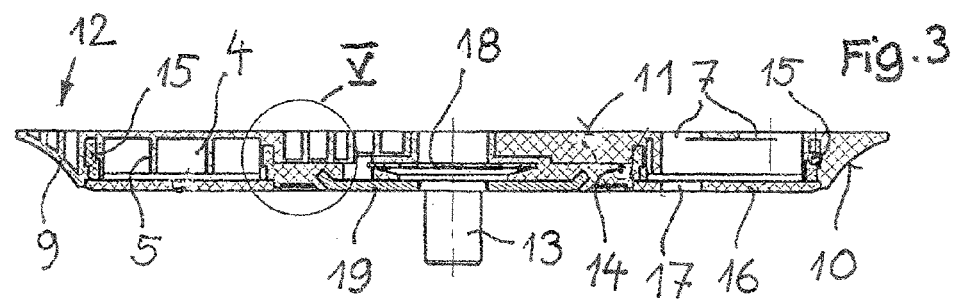

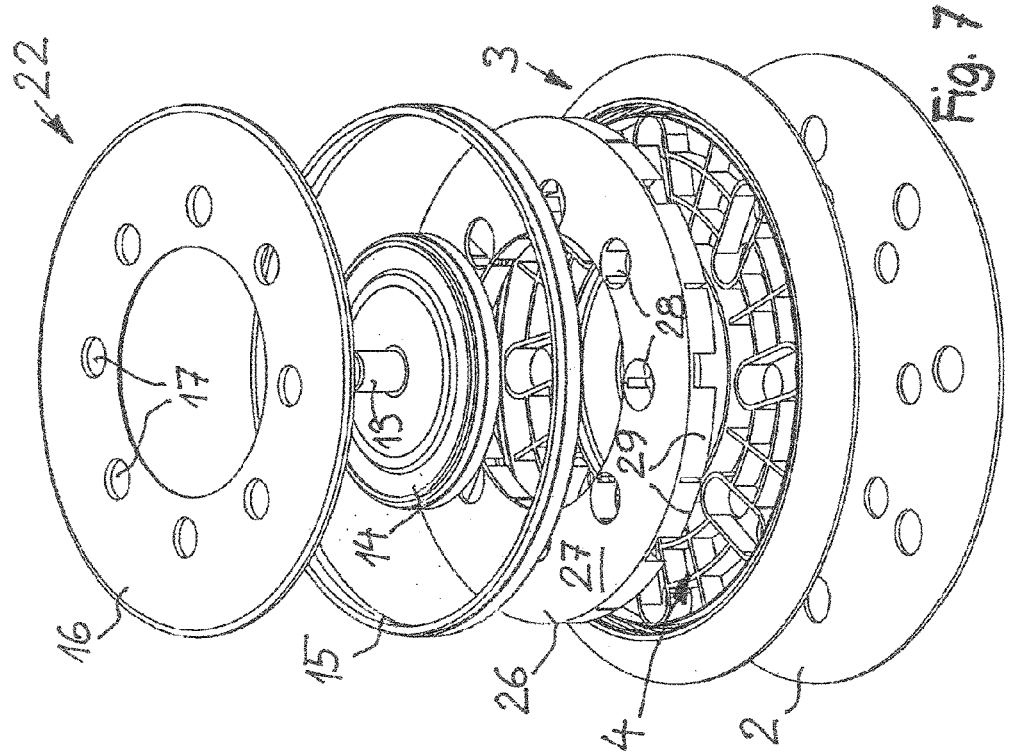
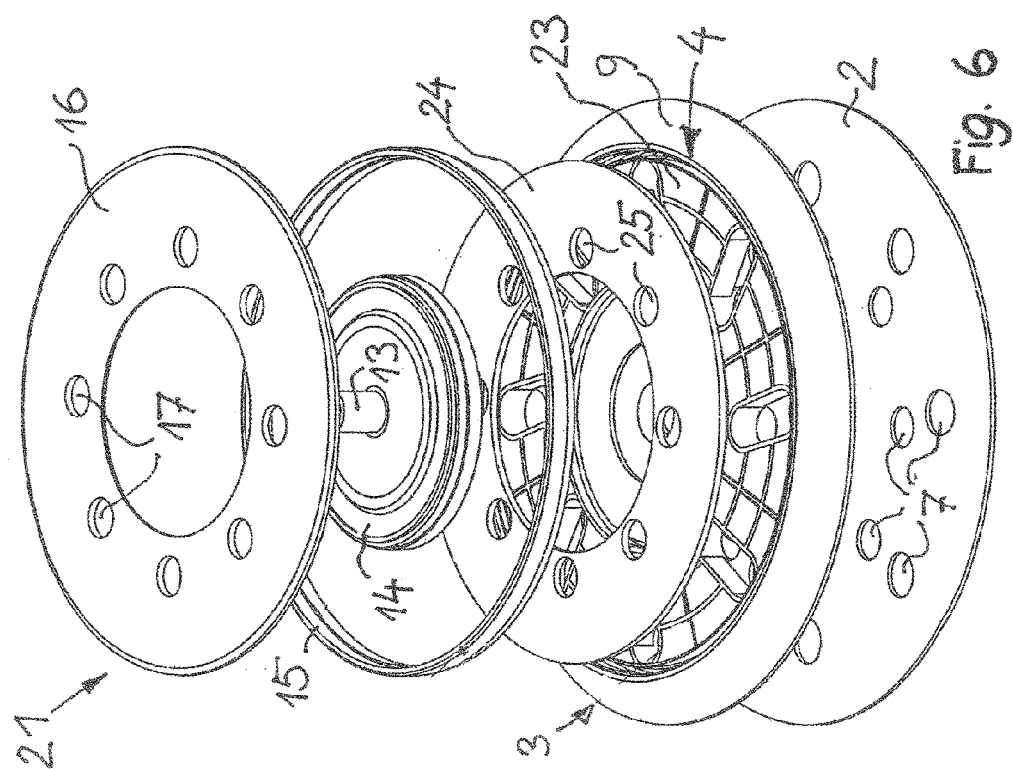

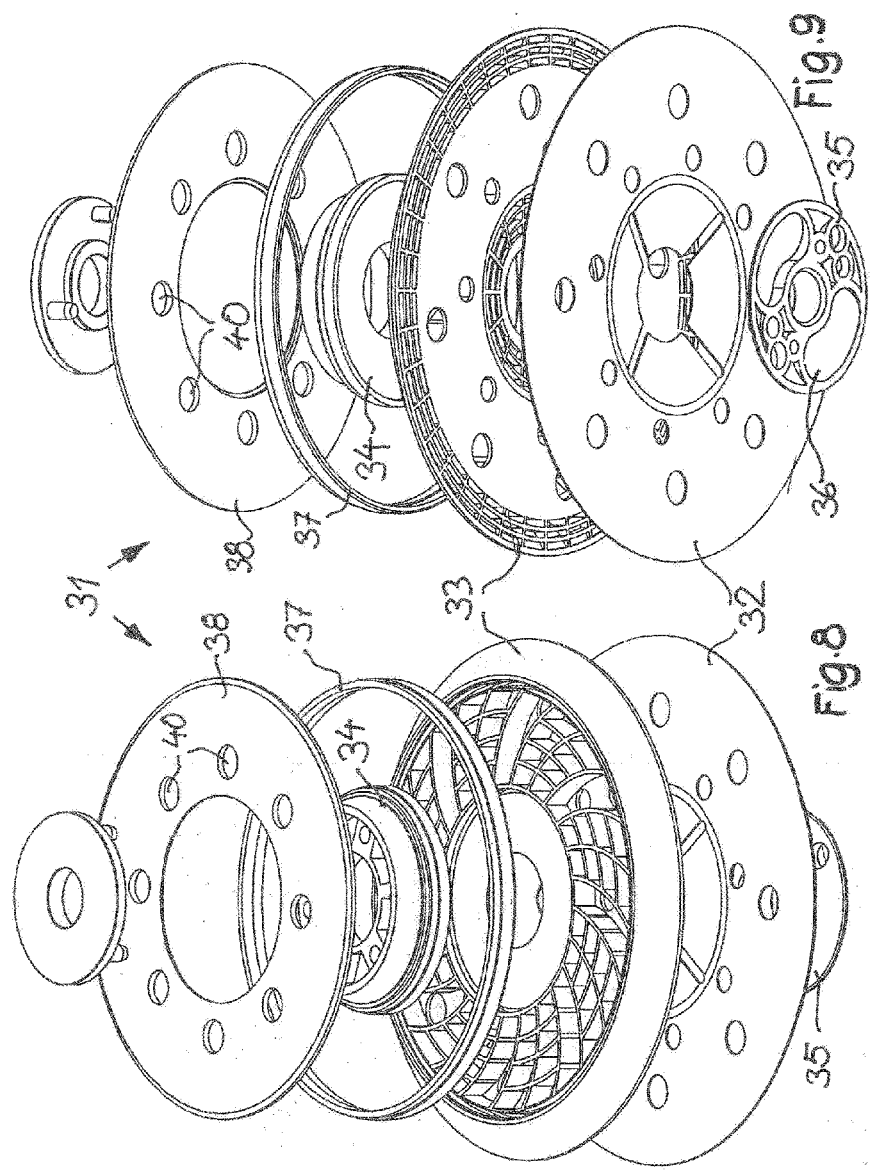

GRINDING DISK

BACKGROUND OF THE INVENTION

For fine machining of surfaces of various products by grinding, polishing and the like, grinding disks are often used which are driven usually by a hand-held drive machine by means of a usually standardized drive connection in a concentrically or eccentrically rotating or alternating movement and on which at a bottom side a proper working material is arranged on a preferably planar bottom surface. In this context, the working material can be fixedly attached to the support surface of the grinding disk located at the bottom side, but it is also possible that the working material is exchangeable, for example, in the form of an abrasive sheet, in that it is releasably attached adhesively by means of an intermediate layer that is provided with an adhesive layer or a hook-and-loop fastener or is clamped at least at one clamping area.

An important part of such a grinding disk is in any case an elastically deformable pad for a more uniform pressure application of the contact surface; such pads have been conventionally produced primarily of foamed elastomeric synthetic material. Such a soft-elastic material was then stabilized usually by a top-side support plate by means of which, in case of grinding disks with extraction passages, also air guiding passages are integrated. Examples of this kind are disclosed in US 2013/0157552 A1 and in EP 2 366 498 A2.

A disadvantage of processing foamed shaped parts of elastomeric synthetic material is, on the one hand, the processing time for foaming and curing which, in particular in regard to high production output tailored to suit the market need, has a slowing effect. The difficult connection to the pad and to the support plate with regard to the extremely different material properties is also disadvantageous.

U.S. Pat. No. 7,223,165 B2 discloses in contrast thereto a grinding disk for fine machining comprising an abrasive sheet or a similar working material that is to be attached to the bottom side of a mostly closed support surface of an elastically deformable pad, wherein the pad is comprised of an injection-molded part of un-foamed elastomeric thermoplastic synthetic material with chamber structures that at least at one side are open and delimited by intermediate walls, wherein the pad on the side opposite the support surface is supported by a support plate of strong material that is connected to a drive connector. The pad is designed to be soft and yielding, as required, by an injection molding process without foaming by being shaped with chamber structures that are open at least at one side. Such an injection molding process enables much higher cycle times in manufacture. In this context, a transition to partially stiffer retaining structures can be provided by a two-component injection molding process in which the upper areas that are oppositely positioned relative to the softer support surface of the pad are made of a second harder material. This possibility is however limited to very limited material combinations and is limited with regard to the stiffening effect. It must also be accepted that the chamber structures that are open at the top side remain open and are prone to soiling. For practical use it is also disadvantageous that according to this prior art a support plate is to be provided as a flange of a drive connector which is to be secured with several screw connections to the pad. This limits the mechanical properties of the grinding disk and also requires a significant mounting expenditure.

SUMMARY OF THE INVENTION

It is therefore an object of the present invention to further develop a grinding disk such that it can be produced inexpensively and in simple way with reduced working expenditure and shorter manufacturing time. It is also an object of the invention to design the manufacturing process for such a grinding disk to be simpler, faster and, as a whole, less expensive in the context of a mass-produced article that is subject to considerable wear in use.

In accordance with the present invention, this is achieved in that the support plate is embedded in the pad with anchoring projections that project into the pad. For the manufacture of the elastically deformable pad the advantageous injection molding process is used, wherein this process is however employed for simplification of the grinding disk and elimination of connecting elements as well as for faster and stronger anchoring of the support plate or its adjoining parts so that they are embedded in the pad. This makes it possible to introduce the parts to be embedded into the injection molding tool prior to injection molding and then incorporate them during the course of molding. The materials to be considered for an injection molding process can be found preferably within the range of thermoplastic synthetic materials, for example, polyester elastomers or polyurethane elastomers. For injection molding, also other elastomers such as a few rubber materials can be used. Rubber materials can also be pressed in a heated state into a mold in order to obtain a pad with a chamber structure and to thereby also embed parts of the support plate during the molding process for the purpose of anchoring.

The materials of the support plate to be entirely or partially embedded are not limited relative to the material of the pad to materials that must be narrowly matched in the context of a fused connection. In principle and also preferably, the material of the support plate as a whole, or in combined parts individually, can be predetermined based on the demands in regard to a higher strength and stiffness. Neither melting nor adhesion is required of the material for the purpose of connection to the material of the pad. Embedding can be limited to a form-fit anchoring action.

On the other hand, considering the pad, the material of the pad can also be selected independent of the material of the support plate wherein also a two component injection molding method is conceivable, for example, in order to stabilize with a stronger component the support surface of the pad and to improve the deformability of the pad with a softer component toward the support plate.

The pad has usually a mainly closed support surface which has usually only limited openings in order to enable dust extraction within the support surface through holes in the working material (working element) and through passages in the pad. With regard to injection molding or compression molding technology, the chamber structures of the pad require open chambers for removal which accordingly must be open in upward direction and also must not be covered by the support plate during the molding process.

In this respect, the support plate basically can be of a grid-shaped design in order to allow the parts of the injection molding tool that shape the chamber structures to penetrate into inner areas of the tool provided for the pad and to thereby also connect the support plate as a whole. Preferably, a top-side closed support plate is provided that covers the grinding disk smoothly and in a way to prevent soiling and optionally allows for a simple introduction of passages for guiding suction air through the pad. For this purpose, the support plate expediently can be of a multi-part configuration with at least one part embedded in the injection-molding material and at least one further part that covers the chamber structures of the injection-molded part. For finishing the grinding disk, these parts are to be connected fixedly with each other only after the injection molding process.

The connection of the parts of the support plate with each other can be basically performed quickly and simply in various ways that fit mass production, for example, by locking action or other form-fit connections. Preferably, a fused connection is however provided for which purpose the parts of the support plate at least in adjoining areas are comprised of a hard fusible synthetic material. Preferred is a hard, optionally also fiberglass-reinforced, thermoplastic synthetic material that, aside from being fusible, is to be selected in particular for the stiffening function of the support plate. For fusing, in the field of mass production various fusing processes are available. In particular, high-frequency welding is suitable.

The support plate can already comprise by way of pre-manufacture a molded-on or molded-in drive connector of metal wherein the support plate or the part of the support plate that is receiving the drive connector can be manufactured by an injection molding process and receives the drive connector of metal in the mold of the injection molding tool by injection molding.

In embodiments of the grinding disk with dust extraction, openings are to be provided in the support plate that at the connection side are aligned with standardized suction connections at the device and are in communication with suction passages in the chamber structure of the pad. When using working materials, the suction passages are to be designed such they register with the hole pattern provided in the working material (working element).

The chamber structures of the pad can also be provided with functionally designed fillings. In this context, heat-conducting fillings can take over distribution and dissipation of heat from the support surface into the pad and to the top side or to the support plate. Heat-conducting fillings of liquid, pasty or grainy materials that are not shape-stable can be enclosed by a cover plate or a cover film in the chamber structures wherein preferably a cover film of the polymer material of the pad or of a material that can be fused thereto can be applied and fused to the surface of the pad.

Moreover, fillings of a shape-retaining material can be inserted and can also be fixedly connected at the top side by a carrier plate to form a single-part component so that no cover film is required.

Instead of or in addition to heat-conducting fillings, also vibration-absorbing or sound-absorbing materials can be installed in the chamber structures. For example, foamed polyurethane with a predetermined oversize can be inserted by press fit and fixed in position.

The invention is furthermore solved by a method for producing a grinding disk for surface machining, in particular a grinding disk as disclosed above, wherein an elastically deformable pad of un-foamed elastomer is produced with chamber structures that are open at least at one side and delimited by intermediate walls and contains a support plate of a strong material which is introduced at least partially into an injection molding or compression molding mold for the pad and is embedded already during the molding process in the pad. This method makes it possible to produce a grinding disk so as to meet the given requirements with respect to robustness in use and the usually high wear in use with appropriately high quantities quickly and inexpensively "cast from the same mold" and to provide in this context the different materials for a yielding soft-elastic pad with a support surface that is sufficiently strong for attachment of the working element (working material), on the one hand, and with a top-side support by means of an integral support plate, on the other hand.

The chamber structures that are to be left open at the top side in the injection molding process or compression molding process for simple and fast removal from the mold can also be closed off by an initially multi-part support plate at the top side when only parts of the support plate that do not cover the chamber structures are embedded in the molding process for the pad and when at least one part of the support plate covering the chamber structures is integrally added to the parts of the support plate anchored in the pad by fusing. The support plate as a whole or the parts to be fused together can be pre-manufactured wherein a hard and stiff synthetic material is conceivable that also may comprise a fiber reinforcement and that during pre-manufacture also embeds preferably metallic elements for a drive connector.

BRIEF DESCRIPTION OF THE DRAWING

FIG. 2 shows a plan view of the grinding disk according to FIG. 1, partially in section view.

FIG. 3 shows a section along section line III-III of FIG. 2.

FIG. 6 shows a perspective view a second embodiment in an exploded illustration.

FIG. 7 shows a perspective view of a third embodiment in exploded view.

FIG. 8 shows an exploded view of a fourth embodiment.

FIG. 9 is a perspective view of the embodiment according to FIG. 8 from below, also in an exploded view.

DESCRIPTION OF THE PREFERRED EMBODIMENTS

Figure 1:
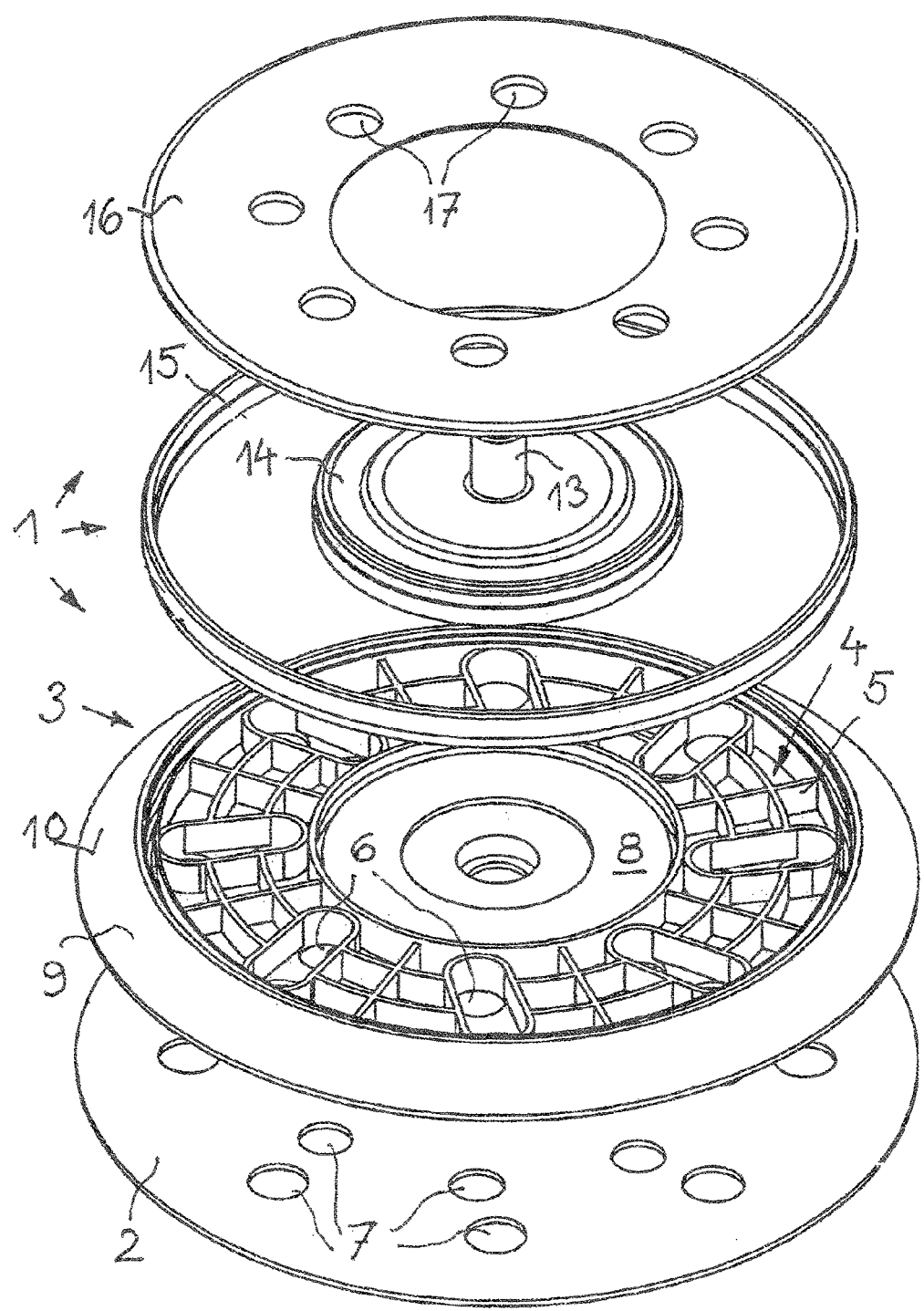
FIG. 1 shows a perspective view of a first embodiment of the grinding disk in an exploded illustration together with an abrasive sheet arranged underneath.
Figure 4:
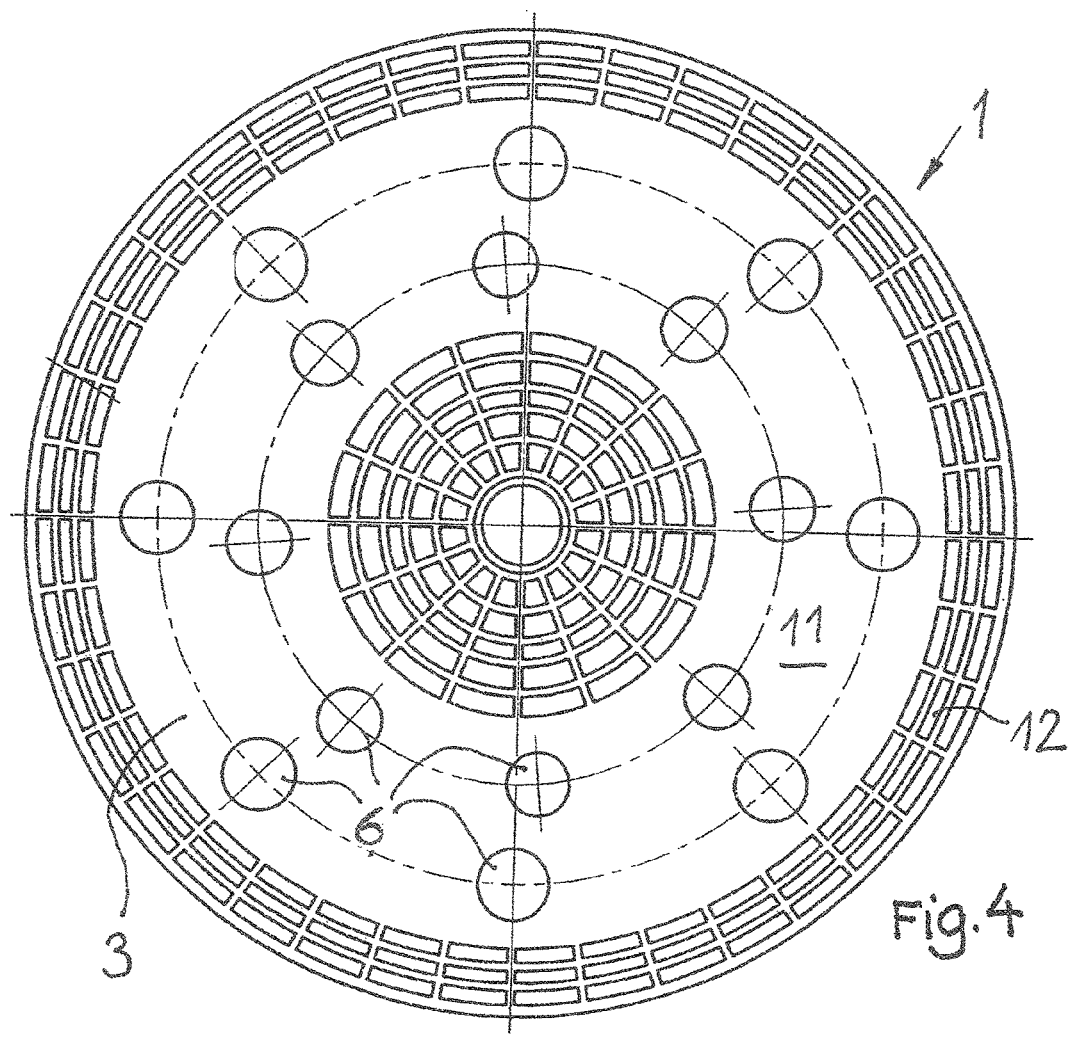
FIG. 4 shows a bottom view of the grinding disk according to FIG. 1 to FIG. 3.

A grinding disk that in FIGS. 1 through 5 is referenced as a whole by reference numeral 1 and provided with an abrasive sheet 2 is of rotational symmetry relative to an imaginary center axis, as is evident form the illustration. This is a well-known configuration suitable for rotary power tools. It is understood however that the grinding disks of the kind considered herein may have other shapes that are not of rotational symmetry. for example, have triangular or rectangular basic surfaces, and may be designed for other particularly also commercially available power tools with rotating but also alternating, circulating or other working movements with designs of the grinding disk that are to be viewed only as modifications relative to the illustrated embodiment.

A main component of the grinding disk 1 is a pad 3 of a soft-elastic polymer, for example, a polyester elastomer or polyurethane elastomer, that is processed by an injection molding method and is to be introduced into an injection molding tool and after quick solidification removed in a short cycle time. The pad 3 is provided thereby on a first face with a chamber structure 4 in an area which is particularly important with regard to the work to be performed and with regard to a yielding action as well as with regard to pressure application, wherein the chamber structure 4 comprises at a bottom side largely closed chambers, open in upward direction, and projecting, laterally delimiting intermediate walls 5 for a predetermined vertical pressure loadability and lateral flexibility. This is a necessity for a simple configuration of the injection molding tool, or at least expedient, in order to be able to remove or eject the pad 3 after the injection molding process. The chamber structure at the bottom side is primarily closed and only interrupted by suction openings 6 that in the present case are to be aligned with suction openings 7 of the abrasive sheet 2.

The abrasive sheet 2 in the present case is to be applied adhesively onto an adhesive layer of the pad 3 provided at the second face or bottom side. In connection with the grinding disk 1 considered herein, the attachment of a working material or working element such as an abrasive sheet 2 that is to be replaced regularly after use can be done in various ways in accordance the variety of attachments that are conventional in practice. For example, the bottom side of the pad 3 can be provided with a contact adhesive or a hook-and-loop attachment for attaching the abrasive sheets with a surface that is adhered thereto. Also, clamping systems can be used that enable clamping of an abrasive sheet, for example, at a central area 7 of the grinding disk by screwing. A grinding disk of this kind can also be provided directly, with elimination of an adhesive bottom surface, with a working material layer, wherein after wear the grinding disk as a whole must be exchanged.

An area 8 of the grinding disk 1, which is concentrically arranged within the chamber structure 4 and, upon rotating working movements such as grinding, polishing or the like movements with usually slightly slantedly positioned grinding disk, is located at the edge of the working area, receives in particular in the upper area components for a drive connector to be described in the following and, in a lower area, is structured chamber-like with chambers that are open downwardly so as to be yielding, wherein this structure also serves to avoid material accumulations that are unfavorable in regard to injection molding technology.

A rim 9 that concentrically surrounds the ring area of the chamber structures 4 that descends with a closed topside 10 to the level of a planar bottom side 11 (see FIG. 3) of the grinding disk, is also designed yieldingly with downwardly open chamber structures 12 so that, when performing surface processing with slantedly applied grinding disk, stress at the edge is avoided.

The grinding disk 1 in the present example is driven purely in rotation by means of a drive connector 13 which in the present case is a pin to be inserted into the chuck of a power drill or an appropriate drive unit. The concentration of the rotatory drive forces requires a load-resistant structure for force transmission from the drive connector 13 into the soft-elastic pad 3. For this purpose, a support plate is provided that is initially comprised of several parts that are then to be joined, wherein the support plate comprises an inner part 14 and an outer part 15 which between them leave open the chamber structure 4 in upward direction, engage the pad 3 with areas of their circular disk shape or ring shape that are projecting toward the pad 3, and at the top side are to be connected by a cover part 16 to a rigid unit forming the support plate.

In the exploded illustration according to FIG. 1, the parts 14, 15, and 16 of the support plate are shown still separate from each other. These parts have already been pre-manufactured by an injection molding process, namely of a hard fiberglass-reinforced synthetic material that must not be selected so as to be connectable by material fusing or welding with the synthetic material of the pad 3. Instead, required is only a form-fit anchoring or adhesion with the synthetic material of the pad 3 in order to produce the desired connection with the pad 3 and the parts 14, 15 of the support plate. These parts are inserted prior to injection molding in predetermined positions into the mold of the injection molding tool for the pad 3 and are then embedded by the subsequent injection molding process for the pad 3 so that they enable a complete force introduction into the pad 3.

In this context, the inner part 14 engages the pad 3 with an axially downwardly extending anchoring area within an inner rim of the chamber structure 4 and the part 15 engages the pad 3 on the exterior side of the chamber structure 4. The chamber structure 4 is however not covered in upward direction so that the molding elements of the injection molding tool can engage from above the mold and also can be moved out in upward direction in order to then enable ejection of the pad 3 with the support plates 14 and 15.

A unitary connection of the parts 14 and 15 with each other and with the drive connector 13 is produced only after the injection molding process by means of the cover part 16. This produces an inherently rigid support plate, covers the top side of the grinding disk with a smooth surface and thus in a way to resist soiling, and also forms air guiding chambers within the pad 3 between the bottom-side suction openings 6 and the topside air passages 17 which are formed in the cover part 16 as a circle of holes.

The initially lose cover part 16 is fused at its rim with the annular areas of the parts 14 and 15 that project from the embedding synthetic material of the pad 3. For fusing, various plastics fusing methods can be used, for example, friction welding or ultrasonic welding; preferred is however a dielectric high-frequency welding process in order to connect the inwardly positioned boundary surfaces of the parts of the support plate reliably with each other.

In regard to the dust extraction, by means of the working material, here in the form of the abrasive sheet 2, a standardized hole pattern with holes 7 is provided which, via the holes 6 in the bottom surface of the pad 3, in case of a congruent configuration or an all together enclosing, optionally also larger, configuration, can be completely utilized. For a reduced suction need, it is also possible based on configuration of the pad 3, by eliminating holes 6 within the pad 3, to provide a partial utilization of the suction holes 7. As can be seen in particular in FIG. 4, the bottom side 11 of the pad 3 has holes 6 that are distributed on two concentric circles of two different diameters, in an arrangement of eight holes each, uniformly about the circumference and are arranged in pairs, one hole father inwardly and one hole father outwardly, on slightly diverging radial lines. Such pairs of holes, as can be seen in FIG. 1 and FIG. 2, are connected via one chamber of the chamber structure 4 at the topside with one of the holes 17. The holes 17 are covered by a bell-shaped cover (not illustrated) or a similar suction device of the drive unit and loaded with suction air when the grinding disk is connected to a power tool that comprises a suction device. It is understood in this context that the desired passages between the suction holes 6, whose position is determined by the working material, and the suction holes 17, determined at least with regard to their diameter by the drive-side devices, are to be designed by means of the configuration of the chamber structure 4 in the pad 3, i.e., air guiding chambers.

Figure 5:
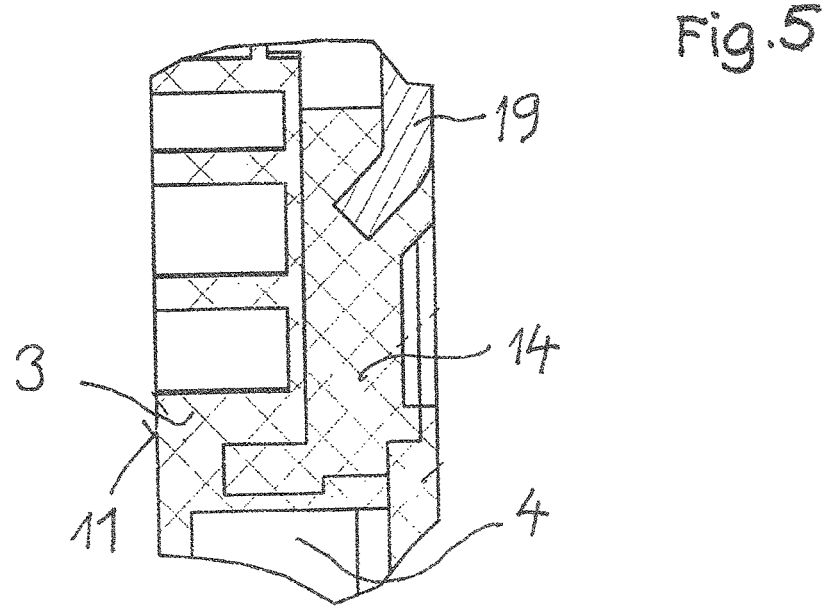
FIG. 5 shows the enlarged detail V of FIG. 3.

As can be seen in the cross-sectional drawing according to FIG. 3 and in particular the detail view according to FIG. 5, the inner part 14 of the support plate is manufactured together with the drive connector 13 already in a composite configuration. The drive connector 13 is comprised of an anchoring plate 18 of metal positioned underneath and an anchoring shell 19 of metal positioned above; the parts 18, 19 are embedded by injection molding during pre-manufacture of the part 14 during the course of an injection molding process and thus anchored in the part 14. This provides in a fast and simple working step a solid unitary connection between the high-strength synthetic material selected for the part 14 and the generally even stronger metal of the drive connector 13 and its anchoring action.

The grinding disk 21 according to FIG. 6 and the grinding disk 22 according to FIG. 7 that are modified relative to the afore described embodiment of the grinding disk 1 according to FIG. 1 also employ the elements of the embodiment illustrated in FIG. 1 in an exploded view and these elements are identified by the same original reference characters in FIGS. 6 and 7. The disks 21, 22 differ only by added components relative to the first embodiment. Accordingly, reference is being had to the afore described discussion of the first embodiment in regard to the identical components.

The grinding disk 21 according to FIG. 6 provides a filling of the chamber structure 4 with a heat-conducting fluid material which can be introduced advantageously so as to extend from the abrasive sheet 2 in upward direction and outwardly for heat dissipation and as an overheating protection relative to friction heat. In order to retain a material that is not shape-stable—the same would hold true also for a fine-grain filling 23 of e.g. metal powder—in the respective chambers that are not serving as passages for air suction, the chambers are closed off by a cover 24 which is a ring-shaped planar film comprised of a material which is compatible with the material of the pad 3, in the simplest case is comprised of the same material, and is then continuously fused with the top edges of the intermediate walls of the chambers. The ring shape of the film is tailored in regard to the inner diameter and the outer diameter such that the chamber structure is covered but the parts 14, 15 of the support plate are not overlapped and only the intermediate space is covered. Moreover, holes 25 are introduced into the ring which are congruent with the holes 17 of the cover part 16 of the support plate in order to not impair the suction air guiding action. By embedding the parts 14 and 15 of the support plate in the pad 3 during the injection molding process and by fusing the cover part 16 of the support plate, a heat-conducting plate for dissipation of working heat is provided in the area of the chamber structure 4.

For the same purpose of heat dissipation but also for purposes of vibration or sound damping, shape-retaining fillings for the chamber structure 4 are also conceivable. However, they can be introduced into the chamber structures without requiring a separate cover film that must be applied by fusing and can be held, free of play, in the chambers, for example, as a result of predetermined press fit. In a particularly advantageous configuration in this respect, the grinding disk 22 according to FIG. 7 is provided with a single contiguous disk member 26 of fill material, for example, foamed polyurethane, that serves for vibration and sound absorption and that is provided at the bottom side with filling projections 29, extending from an upper continuous cover 27 that only has holes 28 for the suction air guiding action; the projections 29 fill all those chamber structures that must not be kept open for the suction air guiding action. This disk has also the contour of an annular member that without overlap is interposed between the parts 14 and 15 of the support plate.

A further grinding disk 31 is shown in FIGS. 8 and 9 in exploded illustrations in a perspective view from above and from below, shown in combination with an abrasive sheet 32 attached to the bottom side which is not connected by means of an adhesive layer or adhesive means to the pad 33 but is to be clamped in the central recessed area by a flat-head clamping screw 35 with finger recesses 36. The screwing action relative to a part 34 of the support plate engages metallic inserts that at the top side are also to be connected to the drive connector 36. The construction of the grinding disk with the parts 34 and 37 of the support plate to be embedded in the pad 33 as an injection-molded product which is completed by a cover part 38 by fusing corresponds to the embodiment of the above-described grinding disks 1, 21, and 22.

FIG. 8 shows also a chamber structure 39 which is one of many possible configurations with intermediate walls that extend slightly spirally in outward direction or concentrically toward each other. The air guiding chambers that serve for suction air guiding are shaped herein in an arc shape also with regard to the special hole pattern of the abrasive sheet 32 and at the top side are oriented toward holes 40 of the cover part 38.

It is understood that in principle the suction air guiding action together with the appropriate openings, designed so as to be continuous from the bottom side of the pad to the top side of the cover part, are not needed in grinding disks in which dust extraction is not required or not possible or not provided for due to other reasons.

The specification incorporates by reference the entire disclosure of German priority document 20 2013 010 480.5 having a filing date of Nov. 21, 2013.

While specific embodiments of the invention have been shown and described in detail to illustrate the inventive principles, it will be understood that the invention may be embodied otherwise without departing from such principles.

What is claimed is:

1. A grinding disk for fine machining of surfaces, the grinding disk comprising:
    a support plate comprising anchoring projections;
    a drive connector connected to the support plate;
    an elastically deformable pad comprised of an injection molded part of un-foamed elastomeric thermoplastic synthetic material, the pad having a first face and an opposite second face;
    the pad comprising a chamber structure provided on the first face, the chamber structure comprising chambers, wherein the chambers are laterally delimited by intermediate walls, wherein the chambers have a top side that is open and is facing in a direction of the first face;
    the pad comprising a substantially closed support surface provided on the second face and facing away from the chamber structure;
    a working element configured to be attached to the support surface;
    the support plate connected to the first face of the pad so as to support the pad;
    the anchoring projections of the support plate embedded by injection molding within the pad.

2. The grinding disk according to claim 1, wherein the support plate is of a multi-part configuration and comprises a first part embedded by injection molding in the pad and a second part covering the chamber structure of the pad, wherein the first part and the second part are fixedly connected to each other.

3. The grinding disk according to claim 2, wherein the first part and the second part are comprised, at least in adjoining areas, of a hard synthetic material and are fused to each other.

4. The grinding disk according to claim 2, wherein the first part is a ring.

5. The grinding disk according to claim 2, wherein the first part and the drive connector form a unitary part, wherein the drive connector is comprised of metal.

6. The grinding disk according to claim 1, wherein the chambers include air guiding chambers that have a bottom side that is open and that is opposite the top side, wherein the air guiding chambers provide a passage for suction air and are arranged to match a predetermined hole pattern of the working element.

7. The grinding disk according to claim 6, wherein the support plate covers the chamber structure and is provided with suction holes arranged to match suction openings of a suction device of a drive unit for driving the grinding disk.

8. The grinding disk according to claim 1, further comprising a filling that at least partially fills the chambers of the chamber structure of the pad, wherein the filling is comprised of a material that is selected from the group consisting of a heat-conducting material, a vibration-damping material, a noise-damping material, and a vibration and noise damping material.

9. The grinding disk according to claim 8, wherein the filling in the chamber structure is enclosed by a cover film.

10. The grinding disk according to claim 8, wherein the filling is a contiguous filler body extending across and covering the chamber structure.

11. A method for producing a grinding disk according to claim 1, the method comprising:
   injection molding in an injection mold an elastically deformable pad of un-foamed elastomer synthetic material;
   prior to injection molding the pad, introducing at least one first part of a multi-part support plate of a hard synthetic material into the injection mold; and
   embedding during injection molding the at least one first part of the support plate in the pad.

12. The method according to claim 11, further comprising, subsequent to embedding, fusing a second part of the multi-part support plate to the at least one first part embedded in the pad.

13. The method according to claim 12, wherein fusing is performed by high-frequency welding.

14. The method according to claim 12, wherein fusing is performed by friction welding.

15. The method according to claim 12, wherein fusing is performed by ultrasonic welding.

* * * * *